(12) United States Patent
Faris et al.

(10) Patent No.: US 10,706,459 B2
(45) Date of Patent: Jul. 7, 2020

(54) AUGMENTED REALITY EXPERIENCE UNLOCK VIA TARGET IMAGE DETECTION

(71) Applicant: NIKE, Inc., Beaverton, OR (US)

(72) Inventors: Ron Faris, Brooklyn, NY (US); Jett House, New York City, NY (US); Aaron Uhrmacher, New York City, NY (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/011,872

(22) Filed: Jun. 19, 2018

(65) Prior Publication Data

US 2018/0365760 A1    Dec. 20, 2018

Related U.S. Application Data

(60) Provisional application No. 62/522,498, filed on Jun. 20, 2017.

(51) Int. Cl.
| | |
|---|---|
| *G06Q 30/00* | (2012.01) |
| *G06Q 30/06* | (2012.01) |
| *G06T 19/00* | (2011.01) |
| *G06F 3/0484* | (2013.01) |
| *G06F 3/0481* | (2013.01) |
| *G06Q 50/00* | (2012.01) |
| *G06F 16/27* | (2019.01) |
| *G06Q 30/02* | (2012.01) |

(52) U.S. Cl.
CPC ..... *G06Q 30/0643* (2013.01); *G06F 3/04815* (2013.01); *G06F 3/04842* (2013.01); *G06F 16/27* (2019.01); *G06Q 30/02* (2013.01); *G06Q 30/0631* (2013.01); *G06Q 50/01* (2013.01); *G06T 19/006* (2013.01)

(58) Field of Classification Search
CPC ...................................................... G06Q 30/00
See application file for complete search history.

(56) References Cited

U.S. PATENT DOCUMENTS

| | | |
|---|---|---|
| 6,585,622 B1 | 7/2003 | Shum et al. |
| 6,932,698 B2 | 8/2005 | Sprogis |
| 7,171,331 B2 | 1/2007 | Vock et al. |
| 8,428,614 B2 | 4/2013 | Wolfe |

(Continued)

FOREIGN PATENT DOCUMENTS

| | | |
|---|---|---|
| WO | 2014107681 A1 | 7/2014 |
| WO | 2014194419 A1 | 12/2014 |
| WO | 2016043663 A1 | 3/2016 |

OTHER PUBLICATIONS

FireFly1, "Amazon Firefly Hands-On—What is it?", video accessible at https://www.youtube.com/watch?v=oVb_5YYXJgg, Dated Jul. 23, 2014. (Year: 2014).*

(Continued)

*Primary Examiner* — Mark A Fadok
(74) *Attorney, Agent, or Firm* — Banner & Witcoff, Ltd.

(57) ABSTRACT

Systems and methods for unlocking selective access for purchasing consumer products through augmented reality are disclosed. A user's mobile device may use augmented reality to capture an image and recognize a target in the image. Upon recognition of a target in the image, the device may overlay a three-dimensional model of a consumer product, and unlock the user access to purchase the consumer product shown.

28 Claims, 12 Drawing Sheets

(56) References Cited

U.S. PATENT DOCUMENTS

| | | |
|---|---|---|
| 8,606,645 B1 | 12/2013 | Applefeld |
| 9,058,764 B1 | 6/2015 | Persson et al. |
| 9,131,339 B1 | 9/2015 | Kulfan et al. |
| 9,142,038 B2 | 9/2015 | Lotto et al. |
| 10,127,725 B2 | 11/2018 | Kohler et al. |
| 2002/0111201 A1 | 8/2002 | Lang |
| 2003/0107178 A1 | 6/2003 | Weston |
| 2004/0024850 A1 | 2/2004 | Miyake |
| 2004/0079797 A1 | 4/2004 | Wadley |
| 2006/0097847 A1 | 5/2006 | Bervoets et al. |
| 2006/0230640 A1 | 10/2006 | Chen |
| 2006/0293103 A1 | 12/2006 | Mendelsohn |
| 2007/0242066 A1 | 10/2007 | Levy Rosenthal |
| 2008/0009349 A1 | 1/2008 | Wolfe |
| 2008/0167129 A1 | 7/2008 | Aaron et al. |
| 2009/0018911 A1 | 1/2009 | An Chang et al. |
| 2009/0227374 A1 | 9/2009 | Tirpak et al. |
| 2010/0079338 A1 | 4/2010 | Wooden et al. |
| 2011/0105092 A1 | 5/2011 | Felt et al. |
| 2012/0136998 A1 | 5/2012 | Hough et al. |
| 2012/0180084 A1 | 7/2012 | Huang et al. |
| 2012/0202600 A1 | 8/2012 | Jalili |
| 2012/0233076 A1 | 9/2012 | Sutcliffe et al. |
| 2012/0320216 A1* | 12/2012 | Mkrtchyan ............... H04N 5/33 348/164 |
| 2013/0178257 A1 | 7/2013 | Langseth |
| 2013/0260727 A1 | 10/2013 | Knudson et al. |
| 2013/0293584 A1 | 11/2013 | Anderson |
| 2014/0025481 A1 | 1/2014 | Kang et al. |
| 2014/0129949 A1* | 5/2014 | Singer ..................... H04L 67/18 715/733 |
| 2014/0172640 A1 | 6/2014 | Argue et al. |
| 2014/0176565 A1 | 6/2014 | Adeyoola et al. |
| 2014/0237578 A1 | 8/2014 | Bryant et al. |
| 2014/0253743 A1 | 9/2014 | Loxam et al. |
| 2015/0106195 A1* | 4/2015 | Holman ..................... G06T 7/00 705/14.46 |
| 2015/0109338 A1 | 4/2015 | McKinnon et al. |
| 2015/0140982 A1 | 5/2015 | Postrel |
| 2015/0205894 A1 | 7/2015 | Faris et al. |
| 2015/0206349 A1 | 7/2015 | Rosenthal et al. |
| 2015/0235267 A1* | 8/2015 | Steube ................ G06Q 30/0261 705/14.58 |
| 2015/0286897 A1* | 10/2015 | Spaith ................ G06K 9/00268 382/224 |
| 2015/0348329 A1* | 12/2015 | Carre ..................... G06Q 30/02 345/633 |
| 2016/0012498 A1 | 1/2016 | Prasad |
| 2016/0070809 A1* | 3/2016 | Rathus ................ G06F 16/9535 705/7.29 |
| 2016/0117061 A1* | 4/2016 | Hodgart ................ G06F 3/1423 715/733 |
| 2016/0292926 A1* | 10/2016 | Rosenthal ........ H04N 21/41407 |
| 2016/0337580 A1* | 11/2016 | Kwon ....................... G06F 3/14 |
| 2016/0367896 A1 | 12/2016 | Lee et al. |
| 2017/0124434 A1* | 5/2017 | Goodwin .............. G06F 16/583 |
| 2018/0021671 A1 | 1/2018 | Liesenfelt et al. |
| 2018/0041545 A1* | 2/2018 | Chakra .................. H04L 51/32 |
| 2018/0089709 A1* | 3/2018 | Rousseau-Villella ........................ G06Q 30/0224 |
| 2018/0190033 A1 | 7/2018 | Barnett et al. |
| 2018/0190324 A1 | 7/2018 | Paul et al. |
| 2018/0350148 A1 | 12/2018 | George |
| 2019/0015747 A1 | 1/2019 | Thompson et al. |
| 2019/0362153 A1 | 11/2019 | Badalamenti et al. |

OTHER PUBLICATIONS

Firefly2, "Firefly FAQ", Amazon.com.Help, dated Jun. 9, 2014 (Year: 2014).*

Firefly3, Perez, "Amazon's Fire Phone Introduces Firefy, a Feature That Lets You Identify (and Buy!) Things You See in the Real World", Techcrunch.com, dated Jun. 18, 2014. (Year: 2014).*

Tagetinasnap1, "Nguyen, Nicole, Buy target items immediately by snapping a photo", Popsugartech, dated: Jul. 23, 2014. (Year: 2014).*

Targetinasnap2, Aheard, Brianna, Target's in a Snap App: Mobile Shopping Via Image Recognition, Innovative Retail Technologies, dated Jul. 25, 2014. (Year: 2014).*

Targetinasnap3, Bourne, Leah, "Now You Can Shop Target Ads on Your iPhone!", Stylecaster, Jul. 22, 2014. (Year: 2014).*

Nov. 30, 2018—(WO) ISR & WO—App. No. PCT/US18/050594.

Nov. 30, 2018—(WO) ISR & WO—App. No. PCT/US18/050599.

Aug. 28, 2018—(WO) ISR & WO—App. No. PCT/US18/038473.

TheHoiYiu: "Nike Augmented reality Case Study", You Tube, May 6, 2011 (May 6, 2011), p. 1, CP054978581, Retrieved from the Internet: URL:https://www.youtube.com/watch?v=BoawN6hVB4c [retrieved on Aug. 14, 2018], the whole document.

Adrianrdzy: Nike AR shoe demo:, You Tube, Mar. 5, 2012 (Mar. 5, 2012), p. 1, XP054978582, Retrieved from the Internet: URL:https://www.youtube.com/watch?v=WjN3CSXF9x0 [retrieved on Aug. 14, 2018], the whole document.

* cited by examiner

AUGMENTED REALITY EXPERIENCE UNLOCK VIA TARGET IMAGE DETECTION

CROSS-REFERENCE TO RELATED APPLICATIONS

This application claims the benefit of and priority to U.S. Provisional Patent Application No. 62/522,498, entitled "AUGMENTED REALITY EXPERIENCE UNLOCK VIA TARGET IMAGE DETECTION," filed Jun. 20, 2017, which is expressly incorporated herein by reference in its entirety for any and all non-limiting purposes.

BACKGROUND

The present disclosure relates to apparatuses, systems, methods, and computer generated user interfaces for using augmented reality features to unlock selective access for purchasing consumer products, such as articles of footwear, articles of apparel, athletic equipment, or any other type of consumer product.

Recent years have ushered in dramatic advancements in electronic computing devices and their capabilities, including advances in augmented reality. Augmented reality may include image-recognition devices capable of receiving instructions and inputs from recognition of captured images. The present disclosure provides for an apparatus and system for unlocking selective access for purchasing consumer products through augmented reality features. While there are systems for limited releases of consumer products, or unlocking selectively access for purchasing consumer products, these systems usually require consumers be ready at a release time, waiting in long lines, or meeting some requirement to be able to purchase the desired product. These systems encourage competition between consumers to gain access, and limits the number of consumers willing to pursue this access.

As social media continues to grow, the influence of individuals with large social media connections expands. Certain individuals have a large number of followers, and have a large influence over the activity of their followers. Endorsement of a particular brand or product by these individuals can greatly increase the popularity and demand of the brand or product. Relatedly, individuals looking to expand their recognition and increase their personal brand often seek to do so by increasing their social media presence. Aspects discussed herein relate to granting certain influential individuals images to share through their social media accounts. A first user may then use a mobile device to view the image on social media. While displayed on the first user's mobile device, a second user may user another mobile device to capture the image as displayed on the first user's mobile device. Upon recognizing the image, the second user's mobile device may unlock the second user selective access to purchase a consumer product or otherwise grant a desired output.

The current disclosure is directed towards systems and methods to overcome one or more of the deficiencies above as well as others in the art.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects of this disclosure relate to systems and methods for unlocking selective access for purchasing consumer products through augmented reality. In certain embodiments, a user's mobile device may use augmented reality to capture an image and recognize a target in the image. Upon recognition of a target in the image, the device may overlay a three-dimensional model of a consumer product, and unlock the user access to purchase the consumer product shown. In some aspects, this image may be recognized from a second user's mobile device. As one example, a user may find an image on social media, and show that image to a friend. The friend may then capture the image using a mobile device, and upon recognizing the image as a predetermined target, the device may communicate with a system and unlock the access for the user to purchase a consumer product. Through these features, consumers are encouraged to share images and view shared images through augmented reality software to determine if the image is a target image that will unlock access for consumer products or other desirable outcomes. In certain aspects a user will only be able to determine if an image contains a target by viewing the image through a specific program. As such, users are encouraged to share images and view the images through augmented reality programs to determine whether images are target images that will be recognized by the program. Further, in some aspects the program may only recognize targets when capturing images shown on another user's device, such that each user may only gain access to the consumer product by capturing images from the other's device. In certain embodiments an individual may be granted a first opportunity to share the image through an online platform, such as social media. Each individual who views the image through augmented reality software may be granted access to purchase a product.

While described above in conjunction with offering access to purchase a consumer product, aspects of this disclosure also may be practiced in conjunction with other features or functions upon recognition of a target within in image. In some aspects the augmented reality program may alter the display of the device upon recognition of a target in an image. Certain features may include altering the display to play a video, to overlay a three-dimensional image, to alter the view of the capture device, such as by changing certain aspects of the images captured by the image capturing device. Indeed, the scope of this disclosure is not limited to unlocking access to purchasing a consumer product.

DETAILED DESCRIPTION

Aspects of this disclosure involve using augmented reality features to unlock selective access for purchasing consumer products, such as articles of footwear, articles of apparel, athletic equipment, or any other type of consumer product. The augmented reality features may be given instructions to execute upon recognizing a target image. In some aspects the target image may be shared through a platform, such as a social media platform. Users may use augmented reality features to search for images that are target images that will unlock access to purchase consumer products. Still further aspects relate to using augmented reality features to generate an output, such as for example, altering the output display of a mobile device based on recognizing a target images. These and other aspects will be discussed in the context of the following illustrative examples of an augmented reality program and un.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
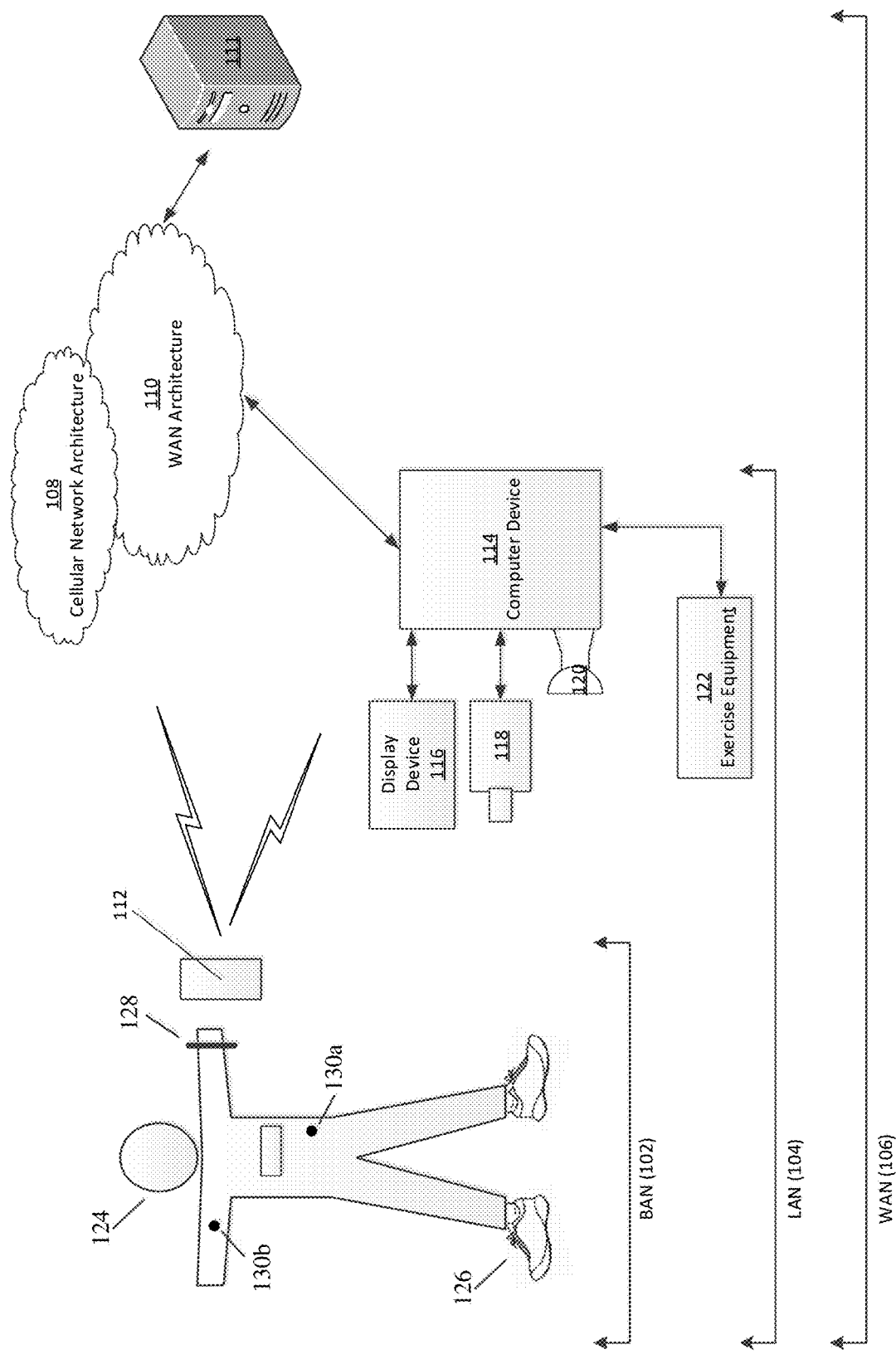
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
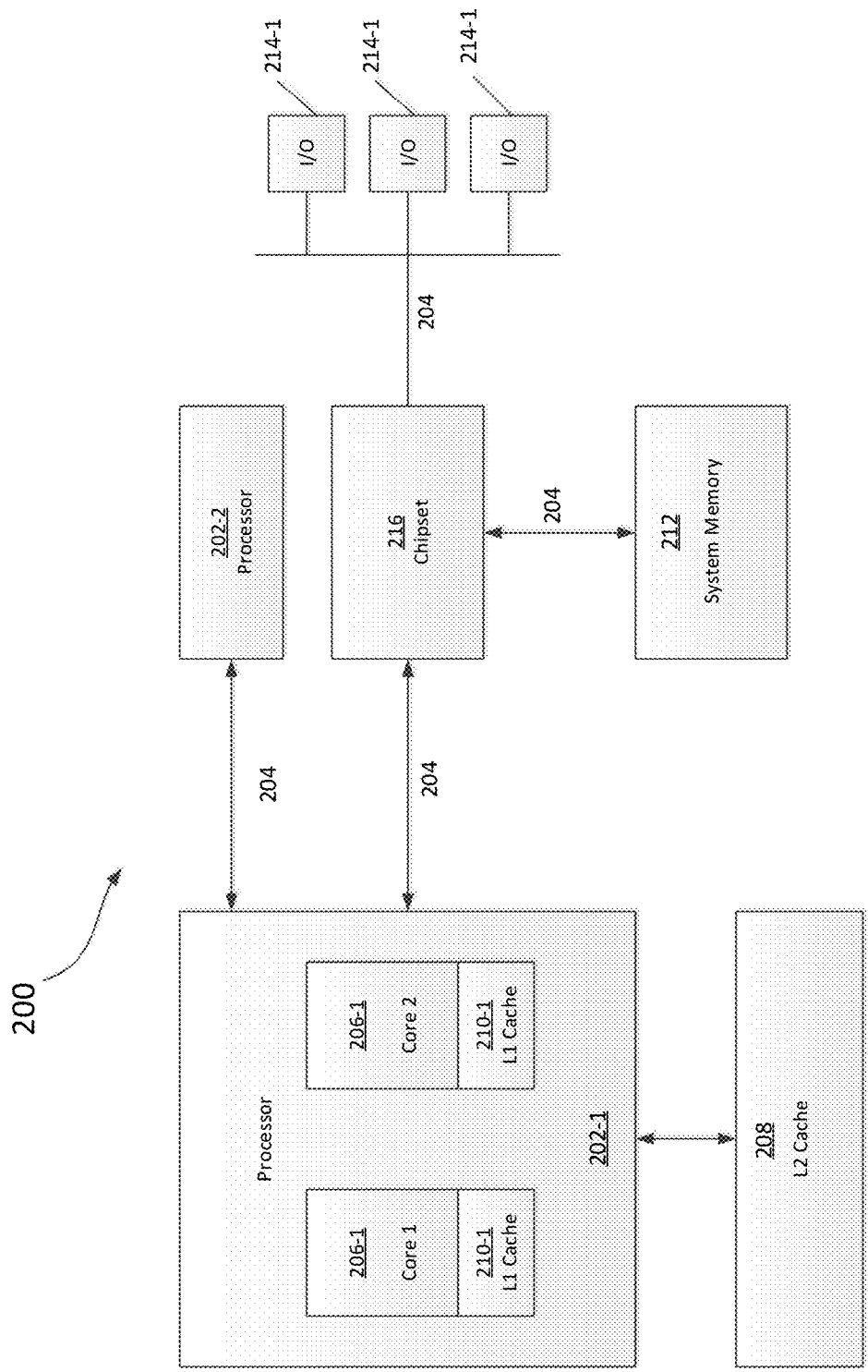
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-mounted device

Figure 3:
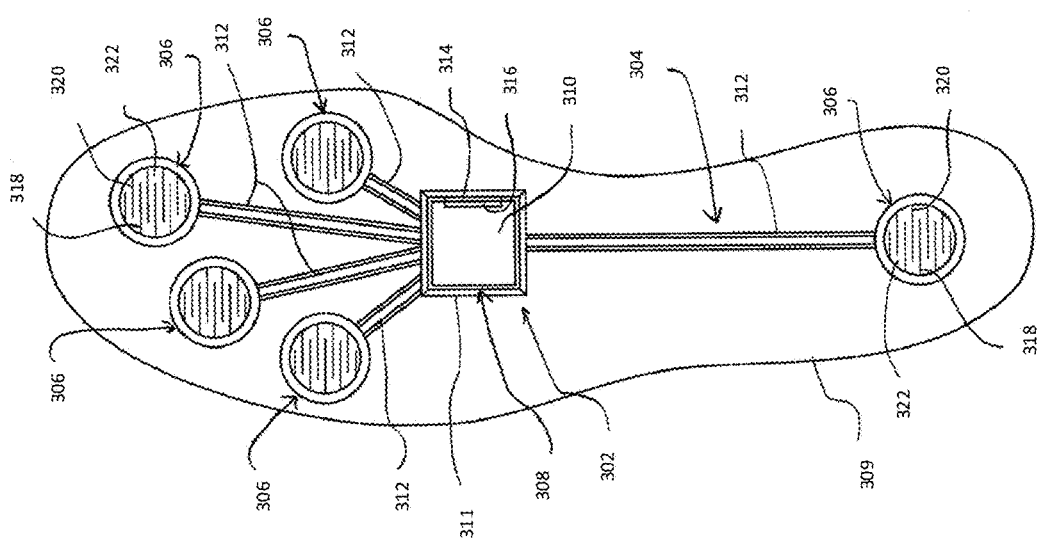
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-worn device

Figure 4:
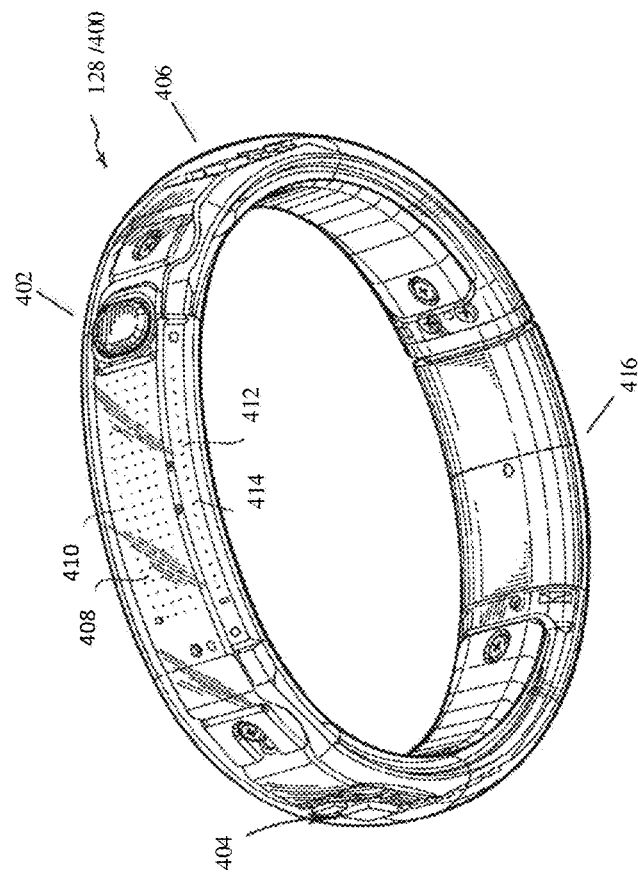
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or body location sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
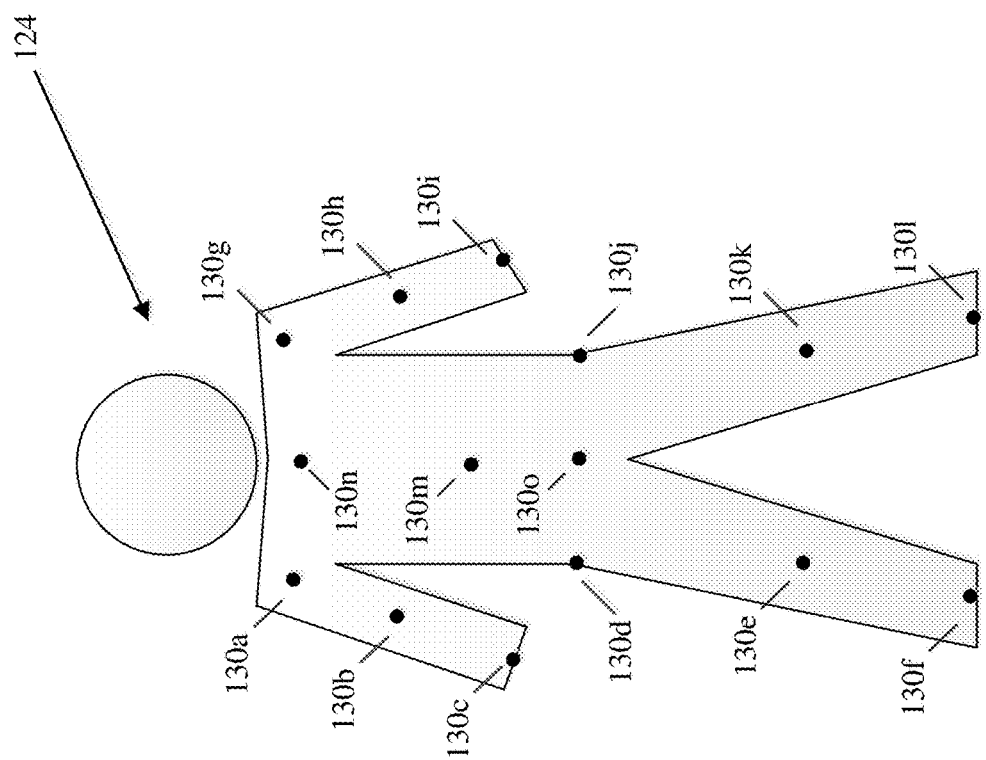
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

Figure 6A:
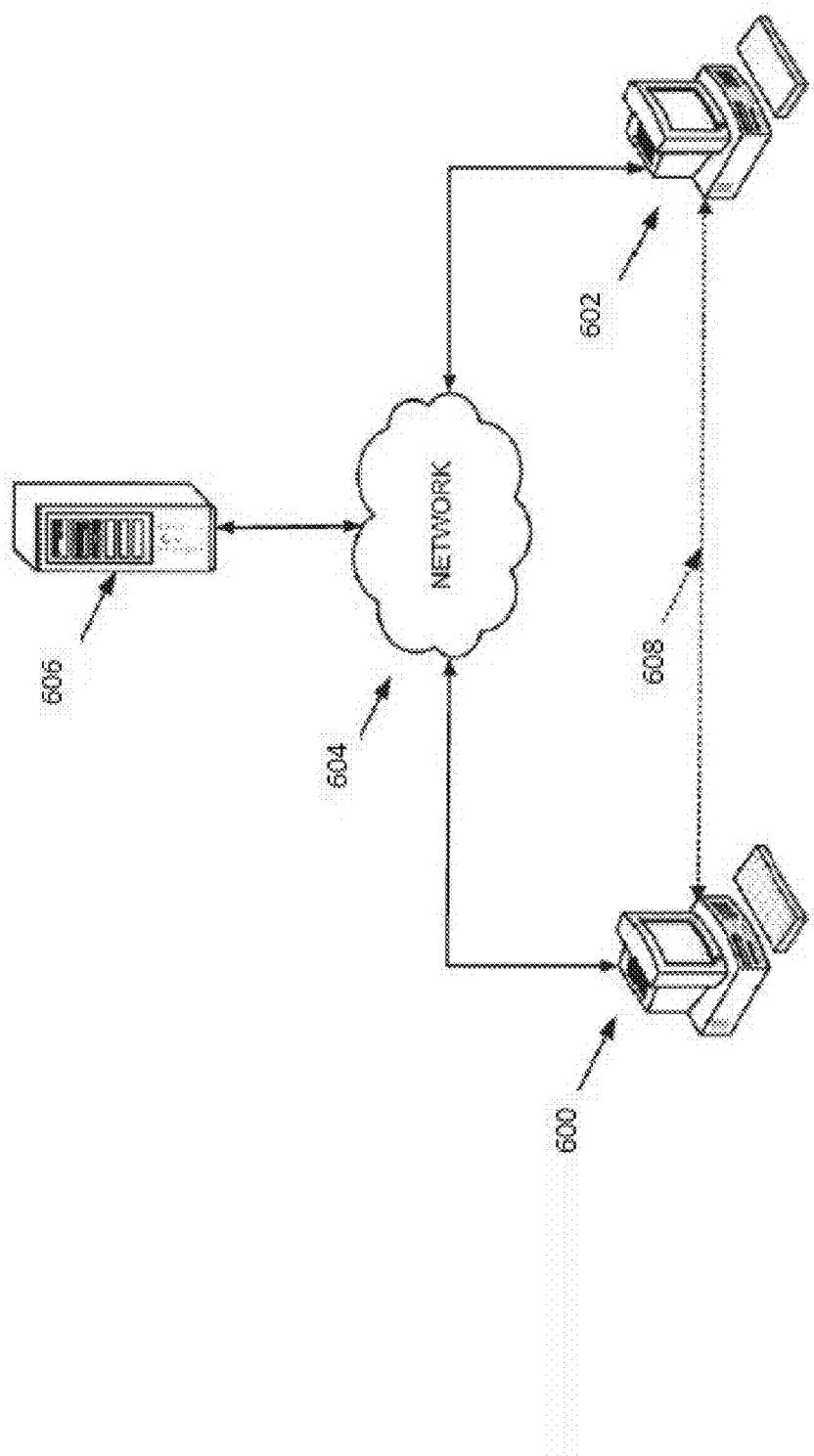
FIGS. 6A through 6C illustrate various examples of hardware and overall networking systems that may be used to implement various examples of the disclosure.
Figure 6B:
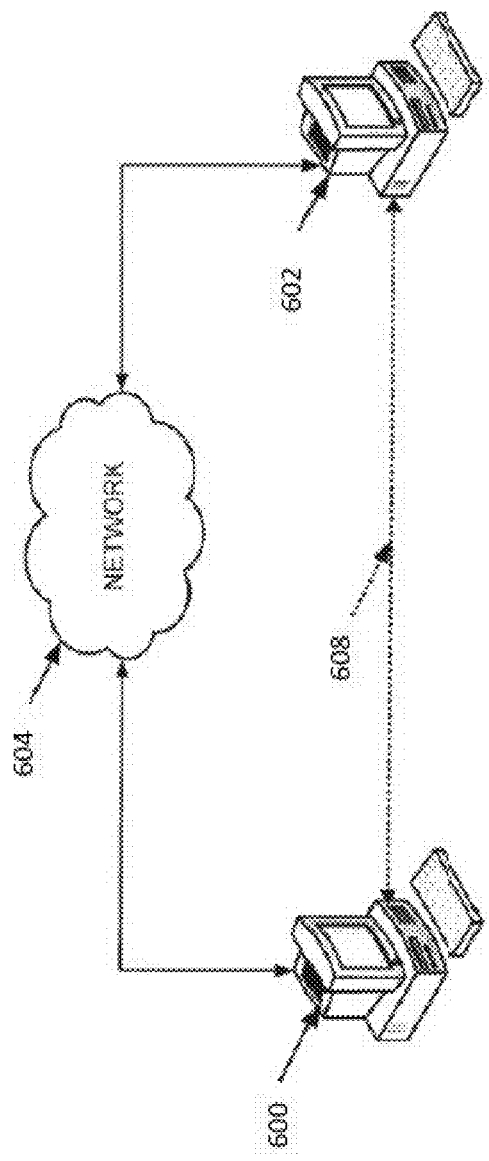
Figure 6C:
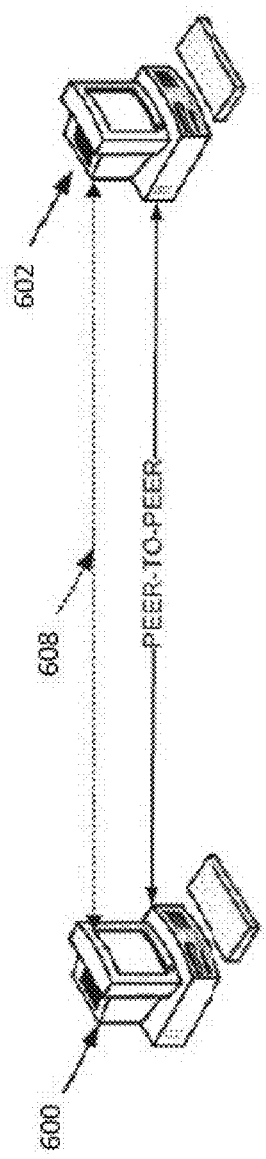

FIGS. 6A through 6C illustrate various examples of hardware systems on which systems and user interfaces according to this disclosure that may be implemented and on which methods according to this disclosure may be practiced. In an embodiment, multiple users may work together share and capture target images using augmented reality programs.

FIG. 6A shows a first computing device 600 and a second computing device 602 connected and in communication with one another via a network 604, such as via an internet connection, via a local area network (LAN), via a wide area network (WAN), etc. The two computing devices 600 and 602 may be located remotely from one another. In some aspects the computing device 600 and 602 may be mobile devices, such as cell phones or tablets. As shown in FIG. 6A, the two computing devices 600 and 602 each establish a communication channel within the network 604 and communicate with a messaging server system 606 (comprising one or more server computers) that provide data or information about the target between the computing devices 600 and 602. Any desired communication link and communication protocol may be used to provide and control the data exchange between computing devices 600 and 602. If desired, this same server system 606 may provide communication data between the users on the computing devices 600 and 602 (such as textual message data, webcam data, etc.) as will be described in more detail below. Alternatively, if desired, a separate communication link 608 may be provided to support transfer of communication data between the computing devices 600 and 602.

Any desired types of computing devices 600 and 602 may be used without departing from this disclosure, such as any computing device capable of establishing a networked connection and/or a peer-to-peer connection and capable of providing the necessary display, user interface, and input capabilities, as will be described in more detail below. Some more specific examples of computing devices 600 and 602 that may be used in systems and methods in accordance with at least some examples of this disclosure include, but are not limited to: desktop computers, personal computers, laptop computers, palmtop computers, handheld computers, cellular telephones, personal digital assistants, computer workstations, televisions, and the like. Notably, the various computing devices 600, 602, etc. may be in communication with the network 604 and the server system 606 in the same or different manners without departing from this disclosure. Moreover, the communicating computing devices 600, 602, etc. used to display and capture the target image may be the same type or different types without departing from this disclosure (such as one desktop computer and one cellular telephone device), and the computing devices 600, 602, etc. may communicate with each other or with a system database 606 via the same communication channels or via different communication channels (e.g., both users may connect to the system database through Wi-Fi, or one may connect to the system database through Wi-Fi while the other connects through cellular data. In further aspects, computing devices may display target images via the same applications or via different applications (e.g., both users may display the target image through a single application, such as Instagram, or through different applications (such as one user through Instagram and another user through a Facebook application, etc.).

Computing devices 600 and 602 that may be used in systems and methods in accordance with examples of this disclosure may include one or more input devices and a data processing system (e.g., including one or more microprocessors). Examples of input devices that may be included with computing devices 600, 602 include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, any desired type of display device may be provided for use in conjunction with the computing devices 600, 602 of systems and methods according to this disclosure, including display devices integrated with the computing device 600, 602 itself or display devices separate from the computing devices 600, 602 but in communication therewith, such as projector displays, separate monitor displays, etc.

The computing devices 600 and 602 may be connected to the network 604 in any desired manner without departing from this disclosure, including in conventional manners that are known and used in the art, such as any conventional wired or wireless connection and using any network connection protocol. The communication channel connection 608 between the computing devices 600, 602 may be the same as or different from the system database connections without departing from this disclosure, and this connection 608 may include technology that is conventional and known in the art. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel. The communication channel 608, when provided, may use all of the same hardware as involved in the target image data exchange, all different hardware, or a combination thereof (e.g., some users using the same hardware, others using different hardware, etc.).

As described above (and as will be described in more detail below), systems and methods in accordance with examples of this disclosure will provide a user interface display on the user's computing device 600, 602. This interface will allow the user to see the target image and will allow the user to display the target image for another user to capture. The user interfaces on the various devices will be provided and controlled by one or more of the computing devices 600, 602 and/or by the server system 606, and data for generating, maintaining, and receiving input through the user interfaces will be generated and provided via computer readable media included as part of or associated with one or more of the computing devices 600, 602 and/or the server system 606. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

In the example overall system shown in FIG. 6A, the software for generating the user interface may reside on computer readable media present on or available to any one of computing device 600, computing device 602, or server system 606. Alternatively, if desired, the software, or at least some portion(s) thereof, may be reside on more than one of, or all of computing device 600, computing device 602, or server system 606. The sever system 606 may be operated and maintained by the same organization(s) or individual(s) that operate and maintain at least one of the computing devices 600 and 602 and/or network 604, or the server system 606 may be operated, controlled, and maintained by a party separate from any or all of these entities. As some more specific examples, server system 606 may be operated and maintained (and the user interface software also may be operated and maintained) by one or more entities whose products are being marketed and granted access through the augmented reality programs (e.g., a manufacturer, a retailer, a vendor selected by a manufacturer or retailer, etc.).

Another example overall system set up is illustrated in FIG. 6B. While the overall network features 604 may be the same as or similar to those described above in conjunction with FIG. 6A (e.g., LAN, WAN, internet, etc.), in this example set up, the separate and independent server system 606 is omitted. Rather, in the setup of FIG. 6B, at least one of the two computing devices 600, 602 (and optionally both computing devices 600, 602) drives the data exchange communications and includes the software for generating and controlling the user interface.

If desired, the networked communication between the users to exchange data may include features that allow the users to communicate with one another about the target image. Alternatively, as shown in FIG. 6B, a separate user communication link 608 is illustrated. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel 608. The communication channel 608 may use the same or different hardware from that used in the target image data exchange.

Collaboration between users to display and capture the target images also may take place, in at least some systems and methods in accordance with this disclosure, via direct communication between computing devices in a peer-to-peer manner, as shown in FIG. 6C. Any desired hardware and/or protocols for this type of peer-to-peer communication may be used without departing from this disclosure, including conventional hardware and protocols as are known and used in the computer communications art. Also, as with the examples of FIGS. 6A and 6B described above, a separate user communication channel connection 608 may be provided (e.g., for instant messaging, additional peer-to-peer messaging, a conventional telephone connection (which may use different hardware from that involved in inputting or capturing the target image data), etc.). The various other alternatives as described above for FIGS. 6A and 6B also may be used in the setup of FIG. 6C without departing from this disclosure.

Figure 8:
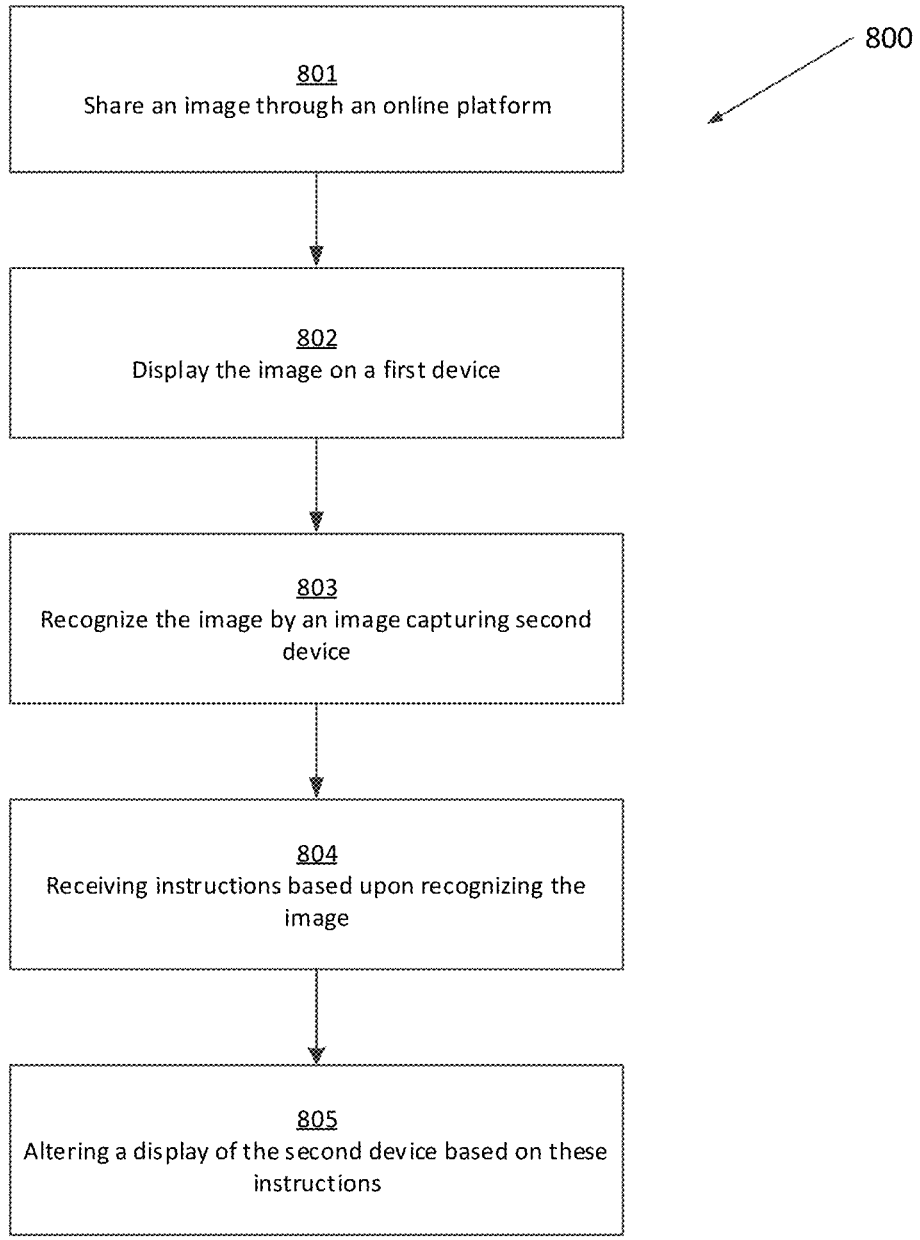
FIG. 8 illustrates a flowchart showing examples of performing steps discussed in the present disclosure.
Figure 9:
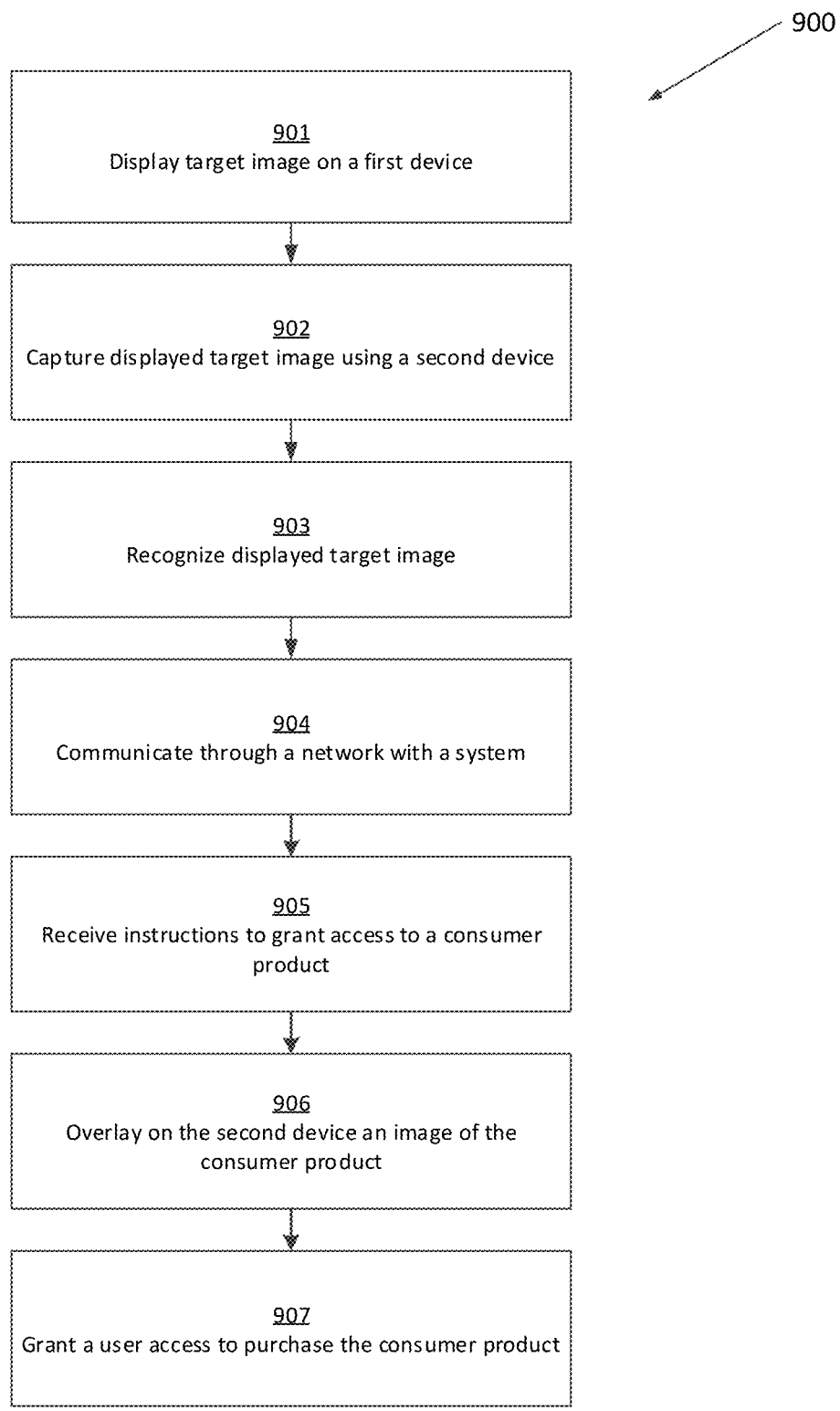
FIG. 9 illustrates another flowchart showing examples of performing steps discussed in the present disclosure.

FIGS. 8-9 illustrate example embodiments for methods of using augmented reality programs to capture target images and upon verifying the captured image is a target image, performing a predefined output such as unlocking access to purchase a consumer product. The steps shown in these example flow charts may be executed by a single computing device, such as processors included in the first mobile device 705 or second mobile device 706. Alternatively, execution of the steps may occur through only one of the first mobile device or second mobile device, or in combination with a system database 707. In some aspects the steps will be performed in order, but in other aspects steps may be performed in a different order or concurrently. For example, in some embodiments, captures may be performed by either of the user device, that capture information communicated to a system database, where the system database then determines if the capture information is recognized as a target image and responding to the user device with instructions. However, in other embodiments, the system database may communicate target image information and instructions to the mobile device prior to the user device capturing an image. Therefore the capturing of the target image, recognition of the target image, and execution of the instructions may all be performed at either user device 705 or 706.

Figure 7:
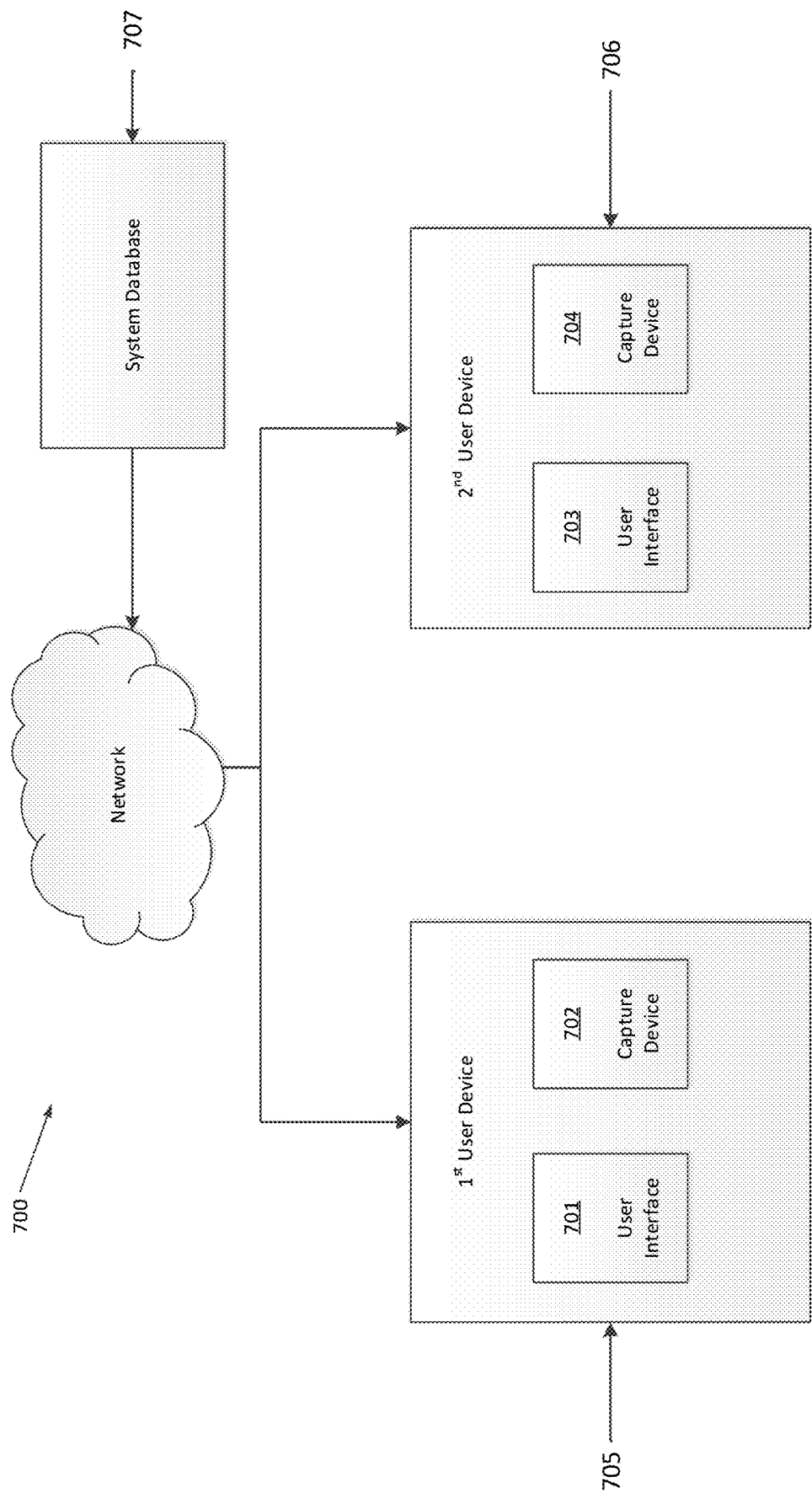
FIG. 7 illustrates an example of a hardware and networking system that may be used to implement various examples of the disclosure.

FIG. 7 illustrates an exemplary system for implementing the present disclosure. As shown in FIG. 7, two user devices may comprise a user interface and a capture device. The user interface may include both a display and an input mechanism, where the input mechanism may be a button, touchscreen, or other way to input information. The image capture devices, 702 and 704, may include one or more video cameras. The image capture devices may be configured to capture or record images or video, including recording or capturing the user interface display, 701 and 703, of the other user's device. The user devices may be connected through a network to a system database which can analyze the captured images or video to determine if a target image is recognized, and send further instructions to the user devices upon confirming recognition of the target image.

FIG. 8 illustrates an exemplary flowchart of steps that certain embodiments may take. First, at step 801, an image may be shared through an online platform. In some aspects this online platform may be a social media platform, such as Instagram, Twitter, Facebook, Google+, or any other social media platform. The image may include target information to be recognized by a capturing device. The image may be shared by a first user through their social media account. As a next step, at 802 the image may be displayed on a first device. This may include through a second user's social media account. In some aspects a first user may share an image through an online platform and a second user may view the image using the same social media platform or through a different social media platform.

At the next step 803, a second device may capture the image and determine whether it recognizes the image. In some aspects the second device may use a camera to take still images or record video of the image. Upon capturing the image, the second device may communicate with a database to determine whether it recognizes the image as a target. If the device confirms recognition of the target image it may receive instructions upon recognizing the image at step 804. The instructions may include unlocking access to allow the user of the second device to purchase a consumer product. In some aspects step 805 may involve altering a display of the second device based on the instructions. This may include overlaying a consumer product on the display, or changing the display such as by presenting a message or video to a consumer, or altering recognized and/or captured images.

FIG. 9 illustrates an exemplary flowchart showing steps that certain embodiments may take. First, at step 901, an image may be displayed on a first device. In some aspects this display may occur through an online platform, such as Instagram, Twitter, Facebook, Google+, or any other social media platform. The image may include target information to be recognized by a capturing device. The image may be shared by a first user through their social media account. At step 902, the image may then be captured using a second device, including through the second device's camera or image capturing device. The second device may then recognize the target image at step 903. This may include communicating with a database to determine whether the database recognizes the image as a target. Upon recognition of the target image, the second device may communicate through a network with a system or a database at step 904. For example, the second device may transmit one or more messages through the network, the one or more messages indicating that the second device has identified the image as being a target image. At step 905, the second device may receive instructions from the system or database to grant the user access to purchase a consumer product. Upon receiving these instructions, at step 906 the second device may overlay an image of the consumer product on the display image. The second device may output for display the image of the consumer product overlaid on the display image. The overlay may be one, two, and/or three dimensional. For example, the device may overlay a three-dimensional projected representation of the consumer product that will be unlocked. In this regard, the image may be overlaid on the recognized target, so that as the user moves the camera around, the projected representation will move, allowing the user to see different angles of the product. At a final step 907, the device may grant the user access to purchase the consumer product that has been unlocked.

Figure 10:
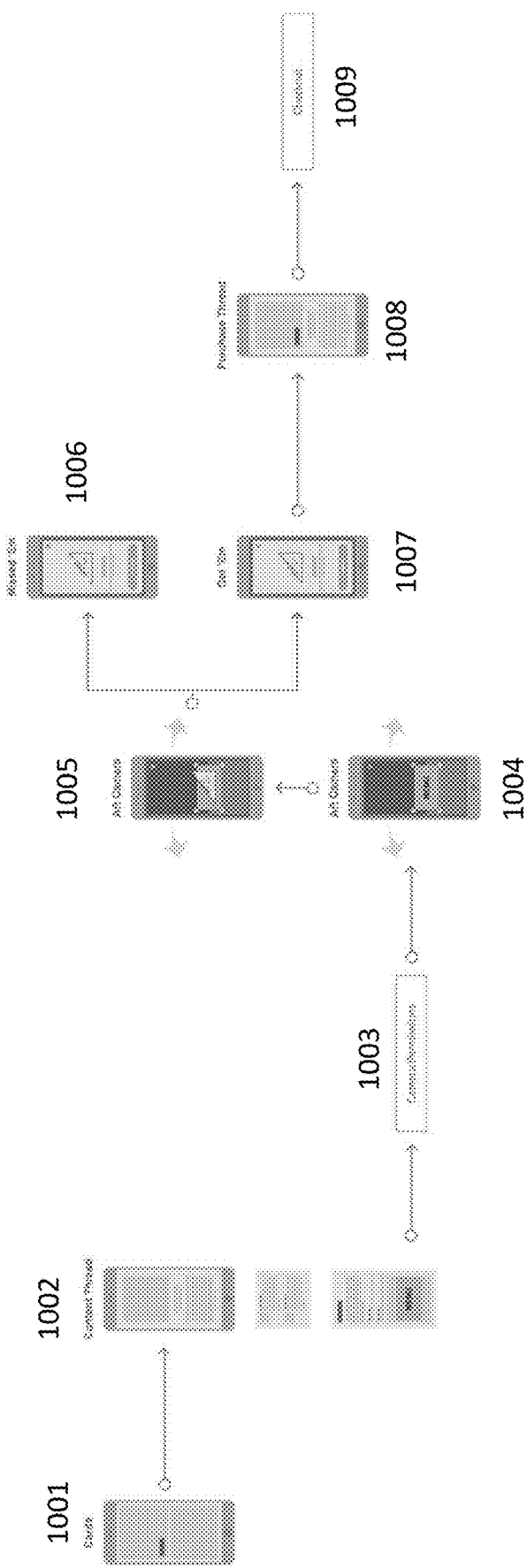
FIG. 10 illustrates another flowchart showing examples of performing steps disclosed in the present disclosure, including the displays associated with the mobile devices.

FIG. 10 illustrates another flowchart showing examples of performing steps disclosed in the present disclosure, including the displays associated with the mobile devices. At step 1001, a software application may be displayed on a computing device. The computing device may be a mobile device, such as a cellular device. The mobile application may include a camera application. The mobile application may be include one or more user interfaces, each of which may display one or more images. At step 1002, a user of the computing device may be consuming content from one or more sources. For example, the content may be generated by and displayed within the software application. In another example, the content may be an Internet website, such as the Internet website of a restaurant. In another example, the content may be an online social media platform. In another example, the content may be sourced from an image capturing application executing on the computing device. At step 1003, the user may access an image capturing application of the computing device. At step 1004, the user may utilize the image capturing application to capture a still image or video image. At step 1005, the computing device may determine that the captured image is a target image. As discussed above in reference to FIGS. 8 and 9, confirming that the captured image is a target image may include communicating with a database. Further at step 1005, the software application may, responsive to determining that the captured image is a target image, generate a modified display within the user interface of the software application. For example, the mobile application may overlay an image of a consumer product onto the captured image. The computing device may then display the image of the consumer product overlaid onto the captured image. The overlay may be one, two, or three dimensional. For example, a three-dimensional image of the consumer product may be overlaid onto the captured image. The resulting image may then be displayed within the software application. Alternatively, the resulting image may be displayed by a specialized augmented reality software application executing on the computing device.

Once the resulting image is displayed (by the specialized augmented reality software application or the software application) the user may unlock the consumer product. In one example, the user may unlock the consumer product by interacting with one or more of the software application, the user interface, and the resulting image. The interaction may comprise viewing the image, sharing the image, saving the image, and the like. If the user successfully unlocks the consumer product, a modified graphical user interface may be output for display at step 1007. The modified graphical user interface may notify the user that the consumer product has been successfully unlocked. The modified graphical user interface may include one or more graphical buttons, which, when selected by the user, allow the user to purchase the consumer product.

In certain instances, the number of times the consumer product may be unlocked may be limited. If the limit has already been reached, a modified graphical user interface may be output for display at step 1006. Here, the modified graphical user interface may indicate that the user has not successfully unlocked the consumer product.

Responsive to viewing the modified graphical user interface output at step 1007, the user may select to purchase the unlocked consumer product. At step 1008, one or more graphical screens may be generated, granting the user permission to purchase the consumer product. At step 1009, the user may complete the purchase of the unlocked consumer product.

In some aspects of the present disclosure, a first individual may share an image through a platform, where a second individual is able to view that image on a mobile device. In some aspects the platform may be a social media platform. By viewing the image on a display on their mobile device, the second individual is able to share the image with a third individual. The third individual may then use an image capture device to capture the image as it displayed on the second individual's mobile device. Upon recognition of the captured image, the third individual's device may grant the third individual access to purchase a consumer product.

In some aspects a user may use a mobile device to capture images, such as through a camera or other image capture means. In some aspects the images may be still images, or the device may be configured to capture videos. In certain embodiments the user may use a mobile device to capture images of the surrounding environment. The mobile device may also have a user interface including a display. In some aspects the user interface and camera may be configured to simultaneously display what the camera is recording on the user interface.

In some embodiments the mobile device may include augmented reality programs. In these embodiments a user may use the camera on their mobile device to capture images in their environment. The captured images may be simultaneously outputted on the user interface display. In some aspects the mobile device may be configured to recognize target images when captured by the mobile device camera. Upon recognition of these target images, the mobile device may communicate through a network with a system database and confirm recognition of the target image. The device may then receive instructions from the system database upon confirmation of the target image.

In different embodiments the instructions may instruct the mobile device through the augmented reality program to overlay a three-dimensional projection on top of the target image being displayed on the user interface. In certain aspects this projection may be a consumer product. The projection may represent a consumer product available for the user to purchase. In some aspects the user interface may allow the user to interact with the projected product. This interaction may include a user input such as a button or the user interface may be touch-screen and allow the user to click on the projected product by touching it. After interacting with the projected product the mobile device may grant the user access to purchase the projected product.

In some examples the system may offer other outcomes upon capturing and recognizing the target image. For example, in some aspects the user may capture an image through a camera, and after recognizing the image as containing a target, the mobile device may change the outputted display in response to recognizing the target image. As examples, the display may continue to output what is being captured by the camera, but may change the outputted display based on recognition of additional targets. In some aspects, the device may recognize a type of product, a brand logo, numbers, designs, letters, or any other target and replace that target on the outputted display. As an example, the user may be in a store, and using the camera to capture the inside of a store. The mobile device may be configured to recognize a particular logo on a product, and then output on the display the images captured by the camera but replace the recognized logos on the display with an image or message for the user.

In certain aspects users may share images through social media platforms. Individuals may then see the images on the social media through displays on their mobile device. An individual who sees the image may share it with a friend, who may look at it through an image capturing device having augmented reality capabilities. Upon recognizing the image, the software may display a three-dimensional product of a consumer product overlaid on the image. This would indicate that the user capturing the image has been granted access to purchase the consumer product shown. In this aspect the user may then choose to search for the image on their social media accounts and share it with their friends, who may use a mobile device with augmented reality capabilities to capture the image and gain access to purchase the product as well.

In some embodiments, a first individual may share an image through social media, where that image includes target information that unlocks access for purchasing consumer products. A second individual may view that image on a mobile device having a display. A third individual may capture that image on a mobile device having image capturing capabilities, where through capturing the image the device recognizes that image and unlocks access for the third individual to purchase a consumer product. In some aspects the system may recognize that the image has been shared and/or captured from another mobile device. In these aspects, the access may be limited to capture from another individual's phone, or from a certain social media application. The number of users who are granted to access to the product may be limited, such that only a certain number of user are granted access before the product is sold out. The system may limit the number of times an image can be shared and still unlock access to the product.

In some embodiments the target image may be shared through social media. Individuals may view the target image through social media accounts. Individuals who view the target image may share the images with friends, who may then capture the image using a camera on a mobile device. The camera may recognize the target image through an augmented reality program, and upon recognizing the target image receive instructions from a system database. These instructions may include overlaying a consumer product projection onto a user interface on the user's device, and unlocking access to the user to purchase the consumer product.

In some aspects the camera may only recognize the target image when it is displayed on another device's screen. In these aspects, access the consumer product will not be unlocked unless the target image is captured from another user's screen. In these examples individuals are encouraged to share the target image with each other. One user may bring the target image up on their mobile device so that another user may capture it and unlock the consumer product. The second user may open the target image on their mobile device so the first user may capture and unlock the consumer product.

In example embodiments, a user's computing device (which may be mobile, stationary, and/or located in a commercial or private setting) may comprise one or more non-transitory computer-readable mediums that comprise computer-executable instructions that when executed by a processor, cause the device to capture an image of a second mobile device, and upon capturing that image recognizing that image as an instruction. The mobile device may then communicate through a network with an external system. Upon verifying the captured image, the system may unlock the mobile device access to purchase a consumer product.

Granting access to consumer products through augmented reality encourages users to share images and be on the hunt for targets in nearly any image. For example, if a user knows that a certain influencer, such as a famous athlete, is releasing a product or endorses a product, that user may scan the athlete's social media accounts to see if any images shared by the athlete have a target that would unlock access to purchase the products. In different aspects this may be footwear, jerseys, apparel, sports equipment, or any other consumer product. It also encourages users to share images among their friends, in the hope that they're able to find target images and capture them using each other mobile device, such as smartphones.

In some embodiments product launches may be rolled out through social media. In these aspects, a product may be announced, but it there is not an announcement about when the product will be released. Rather, an image containing the target information that will unlock access to purchase the product may be given to an influencer, such as an athlete, chef, social media personality, business person, celebrity, etc. The augmented reality program may then be configured to recognize the target image when it is captured using a mobile device. The influencer may then share the product on social media. In some aspects the influencer may not announce that the image contains target data. Rather, consumers are encouraged to look at images using the augmented reality program to find images with target information. After discovering that an image contains target information that will unlock access to a new product or perform some other function, the user is encouraged to share the image with their friends, including through social media. In these aspects, the image will be shared organically through word of mouth as individuals discover that the image has unlock capabilities and share the image.

In some aspects the augmented reality program will be utilized to work on mobile devices, including smartphones, such as an Apple iPhone or an Android phone, tablets, laptops, computers, gaming systems, music players, e-readers, or any other mobile electronic device capable of capturing images.

Figure 11:
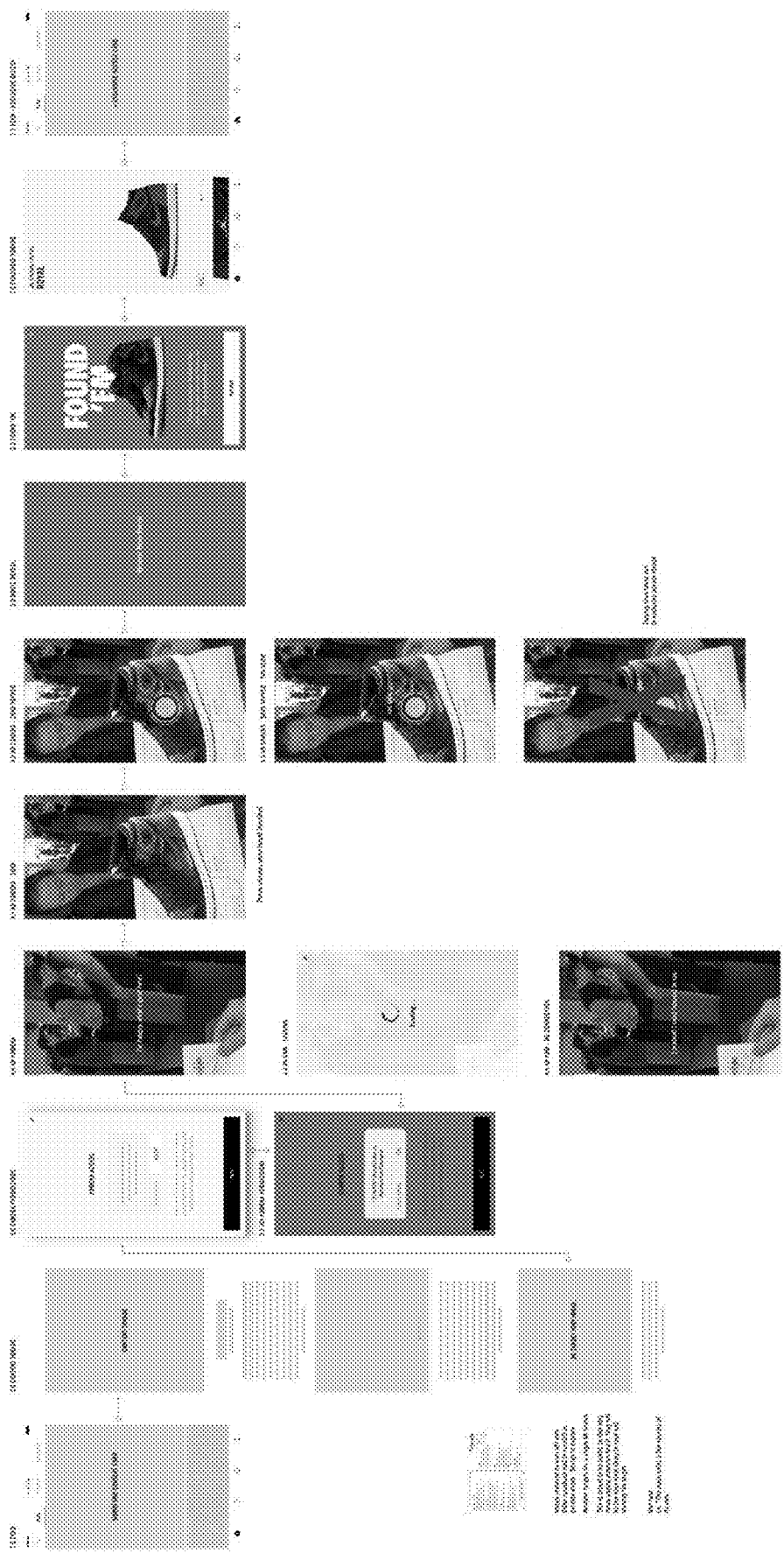
FIG. 11 illustrates another flowchart showing examples of performing steps disclosed in the present disclosure, including the displays associated with the mobile devices.
Figure 12:
FIG. 12 illustration example of the displays that may be utilized by the augmented reality program.

In certain aspects the target image may be a tangible item. As an example, the target image may be a restaurant menu. The augmented reality program may then be configured to recognize when the restaurant menu is captured by the mobile device, and unlock access to purchase a consumer product. In some aspects the mobile device may overlay a projected image on the display as it is capturing the target image. As shown in FIGS. 11 and 12, this projected image may be a shoe that will be unlocked for the user to purchase. Upon discovering that a tangible item is a target image recognized by the augmented reality program, a user may capture and share an image of the tangible item, including with their friends and through social media platforms. Other users who view the image may than capture the image using augmented reality programs on their mobile devices to unlock access to purchase the consumer item or receive whatever other output the mobile device is configured to perform upon capturing and recognizing the target image.

Through these features, users are encouraged to share target images upon discovering them. For example, if a target image is a menu for a restaurant with limited locations, consumers who do not visit one of the restaurant locations would be unable to capture the menu using augmented reality programs. As such, consumers would otherwise be denied access to purchase consumer products that are unlocked through capturing that menu. However, by encouraging users to share images of the target, users may unlock access to these products without viewing a tangible item that is the target image in real life.

Certain embodiments may also include features to encourage users to share target images with their friends and through social media. For example, users may be granted further access to specific products based on sharing target images a number of times, or having other individuals capture target images they have shared. As other examples, users may be granted sales offers, store credit, consumer products, reward points, or social media rewards.

In some aspects the user interface on the mobile device may include a user input option. When the target image is captured and recognized by the augmented reality program, the user interface display may prompt the user to provide an input to unlock the product. In some aspects after unlocking the product the mobile device may connect to an online store, whereby the user may purchase the unlocked product.

In different embodiments after unlocking and purchasing the product, the user may be encouraged to share information about their purchase, such as through social media. In some examples this may be a predetermined message that states which product the user purchased, and/or where the user found the target image. By sharing this information, the user may instruct other users to seek out the target image. In the example of a restaurant menu, the user's message that they purchased a product that they unlocked through capturing a target image that was a menu, other users interested in unlocking and purchasing the product are encouraged to visit the restaurant or view the menu through other means, such as online or social media. In different examples the user's message about purchasing a product may be shared through social media such as Instagram, Twitter, Facebook, Google+, or any other social media platform.

Further aspects of this disclosure may include communication between the personal device back to the system database. Upon unlocking access to a consumer product and/or finalizing the purchase of that product, the mobile device may communicate information to other mobile devices or to the system database. In some aspects this information may include demographic information about the user, information about the purchase, such as size, color, geographic location of the user, or any other information relating to the user or the purchase. This information may be shared with the seller of the product who may maintain an information database comprising information about the products and users that have successfully unlocked and purchased products through the augmented reality programs.

Aspects discussed in the present disclosure encourage collaboration between sellers and influencers. Influencers may be athletes, chefs, social media personalities, business people, celebrities, etc., that are looking to increase their personal brand, including through social media. As such, influencers who are known for releasing target images that unlock high-demand product are going to increase their followers and social interaction with fans and the public. Relatedly, sellers are able to spread their products, messages, and awareness more organically through influencer releasing target images.

The invention claimed is:

1. A method comprising:
    displaying an image, on a first display screen of a first device operated by a first user or on an online platform accessible to a second device operated by a second user that is different from the first user;
    capturing the image, by the second device and from the first display screen displaying the image or from the online platform displaying the image;
    determining, by the second device, that the image is a target image;
    transmitting, by the second device and to a database, one or more messages indicating that the image is a target image;
    receiving, by the second device and from the database, instructions to unlock access to the second user to a product;
    overlaying, by the second device responsive to receiving the instructions, a first image of the product on a display image; and
    outputting, on a second display screen of the second device, the first image of the product on the display image.

2. The method of claim 1, wherein overlaying a first image of the product on the display image comprises projecting a three-dimensional image of the product onto the target image.

3. The method of claim 2, further comprising:
    outputting, by the second device and to a graphical user interface, a user input to allow the second user to select the three-dimensional image of the product.

4. The method of claim 1, wherein determining that the image is the target image comprises communicating with the database to determine that the image is the target image.

5. The method of claim 1, further comprising:
    granting, by the second device, the second user access to purchase the product.

6. The method of claim 1, wherein the online platform is a social media platform.

7. The method of claim 1, wherein the second device is a mobile device.

8. An apparatus comprising:
a first display device configured to be operated by a first user;
one or more processors;
memory storing computer-readable instructions that, when executed by the one or more processors, cause the apparatus to:
capture an image from a second display device displaying the image or from an online platform displaying the image that is accessible to the apparatus, where the second display device is configured to be operated by a second user that is different from the first user;
determine that the image is a target image;
transmit, to a database, one or more messages indicating that the image is a target image;
receive, from the database, confirmation that the image is the target image and instructions to unlock access to a product;
overlay, responsive to receiving the confirmation, a first image of the product on a display image to generate an overlaid image;
display, on the first display device of the apparatus, the overlaid image;
share, to an online platform, the overlaid image;
determine, based on the sharing, that access to the product has been unlocked; and
display, on the first display device, a first graphical user interface indicating that access to the product by the first user has been unlocked.

9. The apparatus of claim 8, wherein overlaying a first image of the product on the display image comprises projecting a three-dimensional image of the product onto the target image.

10. The apparatus of claim 9, the memory storing computer-readable instructions that, when executed by the one or more processors, cause the apparatus to:
output, to the first graphical user interface, a user input to allow the first user to select the three-dimensional image of the product.

11. The apparatus of claim 8, wherein determining that the image is the target image comprises communicating with the database to determine that the image is the target image.

12. The apparatus of claim 8, the memory storing computer-readable instructions that, when executed by the one or more processors, cause the apparatus to:
grant the first user access to purchase the product.

13. The apparatus of claim 8, wherein the image is captured from a social media platform.

14. A system comprising:
a first computing device configured to be operated by a first user, wherein the first computing device is configured to:
display an image on a first display screen of the first computing device;
transmit the image to an online platform for displaying the image on the online platform; and
a second computing device configured to be operated by a second user that is different from the first user, wherein the online platform is accessible to the second computing device, and the second computing device is configured to:
capture the image from the first display screen displaying the image or from the online platform displaying the image;
determine that the image is a target image;
transmit, to a database, one or more messages indicating that the image is a target image;
receive, from the database, instructions to unlock access to the second user to a product;
overlay, responsive to receiving the instructions, a first image of the product on a display image; and
output the first image of the product on the display image to a second display screen of the second computing device.

15. The system of claim 14, wherein overlaying a first image of the product on the display image comprises projecting a three-dimensional image of the product onto the target image.

16. The system of claim 15, wherein the second computing device is further configured to:
output, to a graphical user interface, a user input to allow the second user to select the three- dimensional image of the product.

17. The system of claim 14, wherein determining that the image is the target image comprises communicating with the database to determine that the image is the target image.

18. The system of claim 14, wherein the second computing device is further configured to:
grant the second user access to purchase the product.

19. The system of claim 14, wherein the online platform is a social media platform.

20. The system of claim 14, wherein one or more of the first computing device and the second computing device is a mobile device.

21. The method of claim 1, wherein the image is captured using image capture hardware of the second device.

22. The method of claim 1, wherein the access to the product is required for the second user to obtain the product.

23. The method of claim 1, wherein the image is shared to the online platform by the first user using the first device.

24. The apparatus of claim 8, wherein unlocking the access to the product is required for the first user to obtain the product.

25. The apparatus of claim 8, wherein the computer-readable instructions, when executed by the one or more processors, cause the apparatus to capture the image using image capture hardware of the first display device.

26. The apparatus of claim 8, wherein the image was shared to the online platform by a second apparatus including the second display device.

27. The system of claim 14, wherein the second computing device is configured to capture the image using image capture hardware of the second computing device.

28. The system of claim 14, wherein the access to the product is required for the second user to obtain the product.

* * * * *